United States Patent
Sun et al.

(10) Patent No.: US 9,658,660 B2
(45) Date of Patent: May 23, 2017

(54) ELECTRONIC DEVICE HAVING A BIMETALLIC MATERIAL

(71) Applicant: INTEL CORPORATION, Santa Clara, CA (US)

(72) Inventors: Yanbing Sun, Shanghai (CN); Ming Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 14/124,353

(22) PCT Filed: Dec. 27, 2012

(86) PCT No.: PCT/CN2012/087631
§ 371 (c)(1),
(2) Date: Jul. 18, 2014

(87) PCT Pub. No.: WO2014/101035
PCT Pub. Date: Jul. 3, 2014

(65) Prior Publication Data
US 2016/0187943 A1    Jun. 30, 2016

(51) Int. Cl.
*G06F 1/16*  (2006.01)
*G06F 1/20*  (2006.01)

(52) U.S. Cl.
CPC ............ *G06F 1/203* (2013.01); *G06F 1/1656* (2013.01)

(58) Field of Classification Search
CPC .... G06F 1/1637; G06F 1/1601; G06F 1/1633; G06F 1/203; G06F 1/1613; G06F 1/181; G06F 1/1635; G06F 1/1656; H05K 5/0017; H05K 13/046; H05K 5/04; H05K 5/02; H05K 5/03; H05K 5/069; H05K 5/00; H05K 7/1427; H05K 7/2039; H05K 7/20963; H05K 9/0026
USPC .............. 361/679.55, 679.02, 679.3, 679.09, 361/679.26, 679.21, 679.01
See application file for complete search history.

(56) References Cited

U.S. PATENT DOCUMENTS 7,684,176 B2 *  3/2010  Shimamoto ............. G06F 1/162
                                                                    341/22
2006/0056157 A1   3/2006  Ford et al.
2008/0024966 A1 * 1/2008  Huang .................. G06F 1/1626
                                                                    361/679.06

FOREIGN PATENT DOCUMENTS

CN   102594289 A    7/2012
CN   202488907 U   10/2012
WO   2014/101035 A1  7/2014

OTHER PUBLICATIONS

International Search Report and Written Opinion dated Oct. 3, 2013 for corresponding Application No. PCT/CN2012/087631.

* cited by examiner

*Primary Examiner* — Anthony Haughton
*Assistant Examiner* — Ingrid Wright
(74) *Attorney, Agent, or Firm* — KED & Associates LLP

(57) ABSTRACT

An electronic device may be provided that includes a body having one or more electronic components. The body may have a first portion and a second portion. The second portion may include a first layer of material comprising a first metal and a second layer of material comprising a second metal. At least one electronic component may be between the first portion and the second portion.

20 Claims, 4 Drawing Sheets

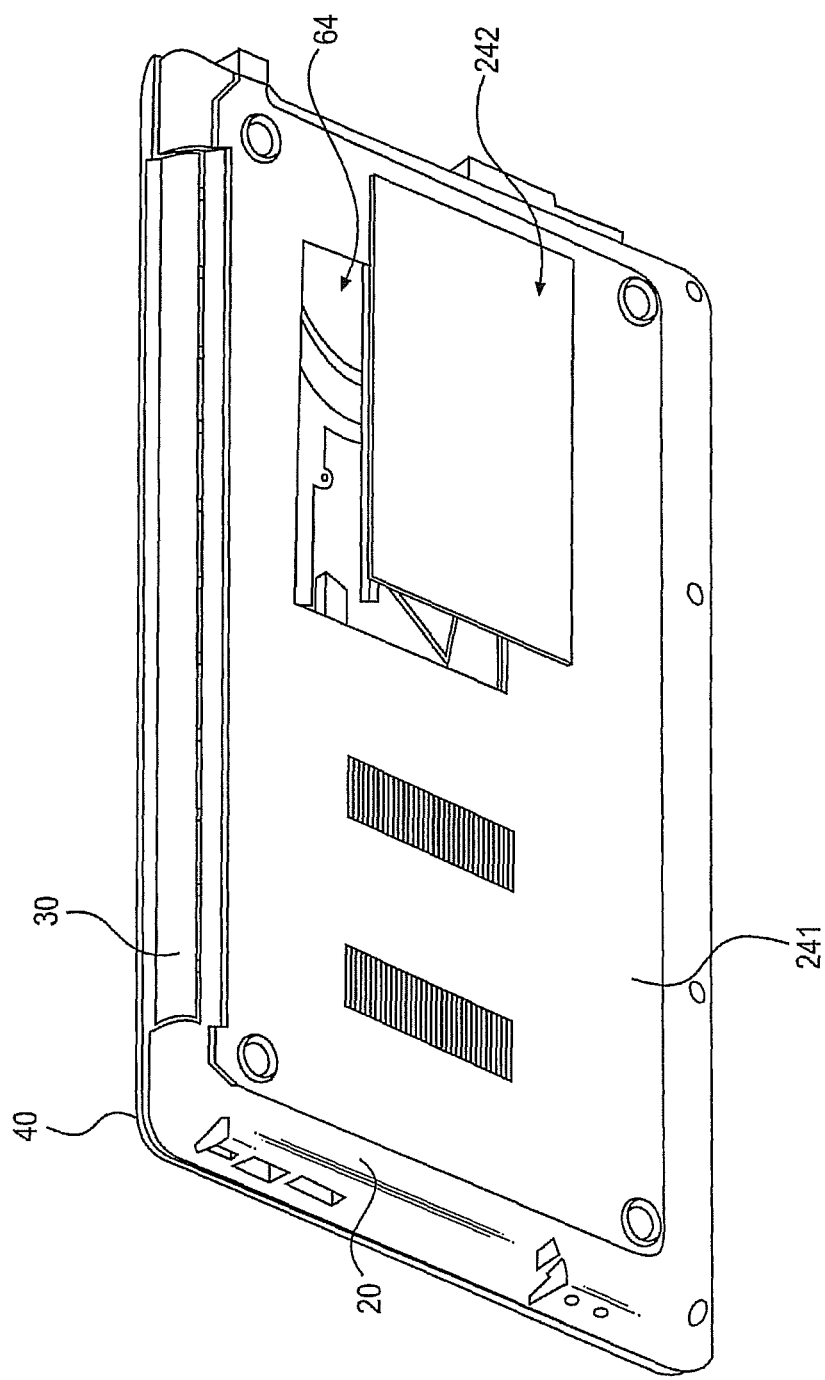

ELECTRONIC DEVICE HAVING A BIMETALLIC MATERIAL

This application is a U.S. National Stage Application under 35 U.S.C. §371 of PCT Application No. PCT/CN2012/087631, filed Dec. 27, 2012.

BACKGROUND

1. Field

Embodiments may relate to an electronic device, such as a laptop computer or a notebook computer.

2. Background

Notebook computers and laptop computers may generate heat when operating.

BRIEF DESCRIPTION OF THE DRAWINGS

Arrangements and embodiments may be described in detail with reference to the following drawings in which like reference numerals refer to like elements and wherein:

FIG. 3 is a bottom view of a computer according to an example arrangement; and

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Arrangements and embodiments may be described with respect to a computer, such as a laptop computer or a notebook computer. However, arrangements and embodiments may be applicable to other electronic devices, such as mobile communication terminals.

As used hereinafter, a computer may be described as having a base and a lid. The base may be formed of a chassis, which defines the structure of the base. An outer surface of the chassis may be called a skin. An inner surface of the chassis may be called a chassis wall (or inner chassis wall). The lid may also be formed of a chassis, and thus may have similar descriptions.

Embodiments may reduce a skin temperature of a computer by adjustment of an air gap by using a bimetallic material structure (or a bimetallic material). Embodiments may provide a bimetallic material structure to a computer chassis, and thereby reduce a skin temperature by increasing the air gap between a hot component and an inner chassis wall. The bimetallic material structure may be provided at or near hotspot areas.

Figure 1:
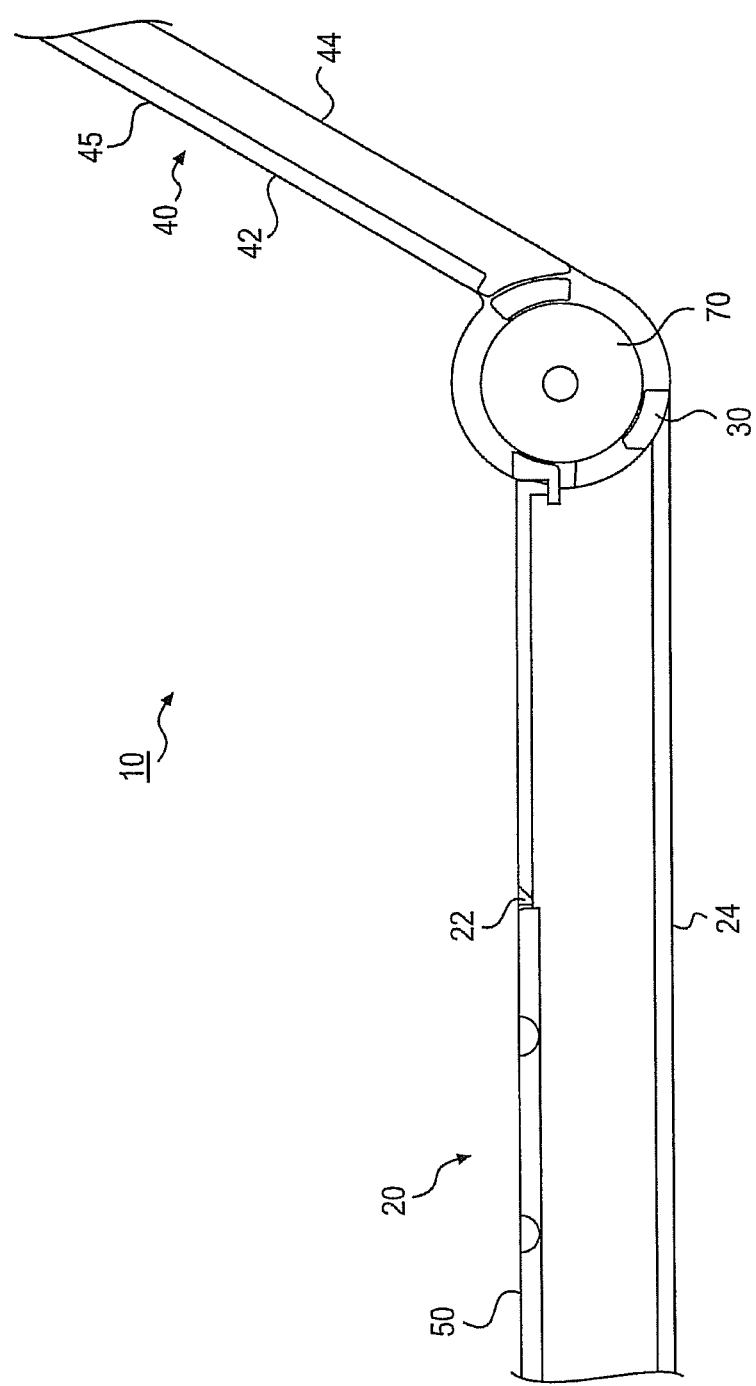
FIG. 1 is a side view of a computer according to an example arrangement.

FIG. 1 shows a computer according to an example arrangement. Other arrangements and configurations may also be provided.

FIG. 1 shows a computer 10, such as a notebook computer or a laptop computer. The computer 10 may include a base 20 and a lid 40 that are coupled together by a hinge device 30. FIG. 1 shows the computer 10 in an opened state (or an opened position) in which the lid 40 is separated away from the base 20. The computer 10 may also be provided in a closed state (or a closed position) when the lid 40 is closed so as to be adjacent to the base 20.

The base 20 of the computer 10 may support various components such as a processor, a touch pad, a memory, a keyboard 50, a circuit board, a battery, etc. These components may generate heat during operation of the computer 10.

The lid 40 of the computer 10 may support a display 45 for a user to view during use of the computer 10. The lid 40 may support other electric components. The components of the lid 40 may generate heat during operation of the computer 10.

When the computer 10 is in the opened state, the keyboard 50 on the base 20 and the display 45 on the lid 40 may be exposed to a user located in front of the computer 10.

The base 20 may include a first side 22 (or a top side) and a second side 24 (or a bottom side). The lid 40 may include a first side 42 and a second side 44. When the computer 10 is in the opened state (such as shown in FIG. 1), the first side 42 of the lid 40 is separated away from the first side 22 of the base 20. In other words, the keyboard 50 on the first side 22 of the base 20 is exposed to a user and the display 45 on the first side 42 of the lid 40 is exposed to a user. When the computer 10 is in the closed state, the first side 42 of the lid 40 is closed so as to be adjacent to the first side 22 of the base 20. In other words, the keyboard 50 on the first side 22 of the base 20 is not exposed to a user and the display 45 on the first side 42 of the lid 40 is not exposed to a user.

The hinge device 30 may allow the lid 40 to rotate (or move) about a rotational axis that is parallel to a width of the lid 40 (or a width of the base 20). The lid 40 may rotate about the rotational axis of the hinge device 30 between the closed state and the opened state.

In at least one arrangement, a heat exchange device 70 may be provided in an area of the hinge device 30 between the base 20 and the lid 40. The heat exchange device 70 may be adjacent to the hinge device 30 in an area between the base 20 and the lid 40, and the heat exchange device 70 may create an opening (or openings) in the area between the lid 40 and the base 20. The heat exchange device 70 may be passive in at least one example arrangement.

Other types of heat exchange devices may also be provided. Heat exchange devices may be provided in other areas of the base 20 and/or the lid 40.

The base 20 may also include numerous components between the first side 22 and the second side 24. The components may be considered internal components (or within the base 20). The internal components may include a processor on a circuit board, for example.

A thermal attacher may be coupled to the processor (or other internal component) and a heat spreader may be coupled to the thermal attacher. The heat spreader may be a heat pipe. The thermal attacher and the heat spreader may also be called a heat dissipating device to dissipate heat from the processor to the heat exchange device 70 (or other heat exchange device).

Figure 2:
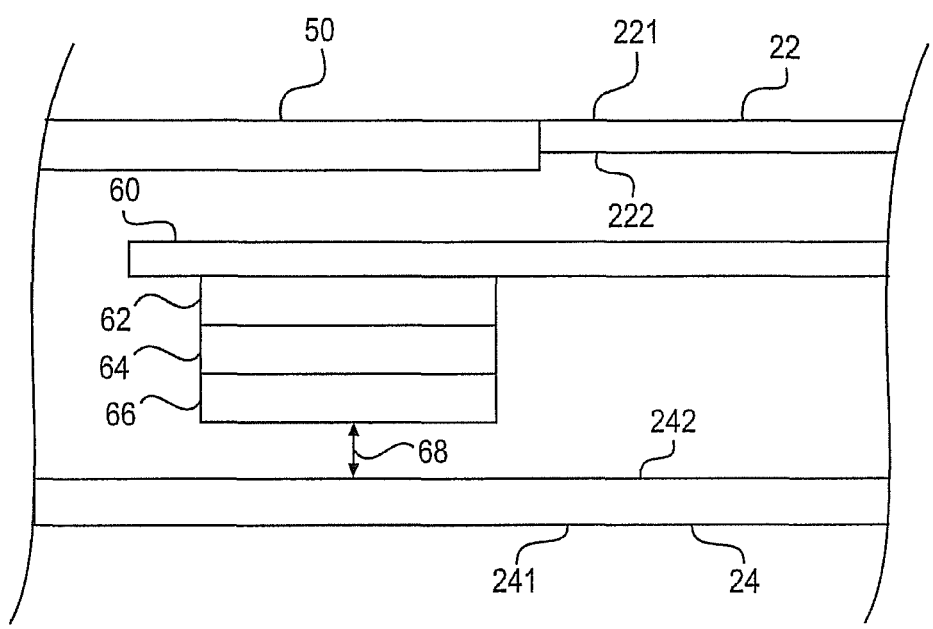
FIG. 2 is a side view of a computer according to an example arrangement.

FIG. 2 is a side view of a computer according to an example arrangement. Other arrangements and configurations may also be provided.

FIG. 2 shows components between the first side 22 (or the top side) and the second side 24 (or the bottom side) of the base. An outer surface 221 of the first side 22 may be called a skin, and an inner surface 222 of the first side 22 may be called a chassis wall (or inner chassis wall). An outer surface 241 of the second side 24 may be called a skin, and an inner surface 242 of the second side 24 may be called a chassis wall (or inner chassis wall).

The keyboard 50 may be provided on the top of the base 20. The outer surface 221 of the first side 22 (i.e., the upper skin) may surround edges of the keyboard 50 (or the keyboard device). The internal components of the base 20 may include a circuit board 60 (such as a printed circuit board), a socket 62, a processor 64 and a thermal device 66, for example. Other internal components may also be provided.

The circuit board 60 may be provided between the first side 22 and the second side 24 of the base 20. The socket 62 may be provided on the circuit board 60 to couple the processor 64 to the circuit board 60. The thermal device 66, such as a heat sink, may be provided on the processor 64 to help dissipate heat from the processor 64.

FIG. 2 shows a gap 68 between the thermal device 66 and the inner surface 242 (or the chassis wall) of the second side 24. The gap 68 may be an air gap. A distance of the gap 68 may affect a temperature of the skin (i.e., the outer surface 241 of the second side 24).

Internal components may produce heat and/or may be heated during use of the computer 10. These devices may be called heat producing devices, hot devices, hot components, etc. For example, the processor 64 and the thermal device 66 may be considered a hot component.

A temperature of the chassis of the second side 24 may be dependent on a distance between a hot component (such as a heat producing device) and the inner surface 242 (or the chassis wall) of the second side 24. For example, when the distance (or gap) between a hot component and the inner surface 242 (or the chassis wall) of the second side 24 decreases, then a temperature of the skin (i.e., the outer surface 241) forming the second side 24 may increase. On the other hand, when the distance (or gap) between a hot component and the inner surface 242 (or the chassis wall) of the second skin 24 increases, then a temperature of the skin forming the second side 24 may decrease.

In FIG. 2, the air 68 may represent the distance between a hot component and the inner surface 242 (or the chassis wall) of the second side 24. When the gap 68 (such as between the thermal device 66 and the inner surface 242 (or the chassis wall) of the second side 24) decreases, then a temperature of the skin (i.e., the outer surface 241) forming the second side 24 may increase. On the other hand, when the gap 68 (such as between the thermal device 66 and the inner surface 242 (or the chassis wall) of the second skin 24) increases, then a temperature of the skin forming the second side 24 may decrease.

When a temperature of a skin of a computer increases, then a user may have a lower comfort level (due to the higher temperature).

FIG. 3 is a bottom view of a computer according to an example arrangement. Other arrangements may also be provided.

FIG. 3 shows that the second side 24 of the base 20 may include the skin 241 and a door 242. The skin 241 may surround edges of the door 242. The door 242 may be provided at an area that corresponds to a location of a heat producing device (or hot component) provided inside the base 20, such as the processor 64. The door 70 may be aligned with the heat producing device (or hot component) so that the door 70 may be easily removed for access to the processor 64.

The door 70 may also be called a sheet, a plate or a patch, for example.

The door 242 may be attached to the skin 241 by screws or other attaching device (such as snaps). The door 242 may be positioned so that it may be removed from the base 20 for access to internal components.

In an example arrangement, the skin 241 may be formed of plastic or metal (such as an Al alloy). As will be discussed below, in an example embodiment, the door 70 may be a bimetallic material structure.

Embodiments may provide a bimetallic sheet/door/patch/plate to a computer chassis on a hot area for skin temperature reduction.

Figure 4A:
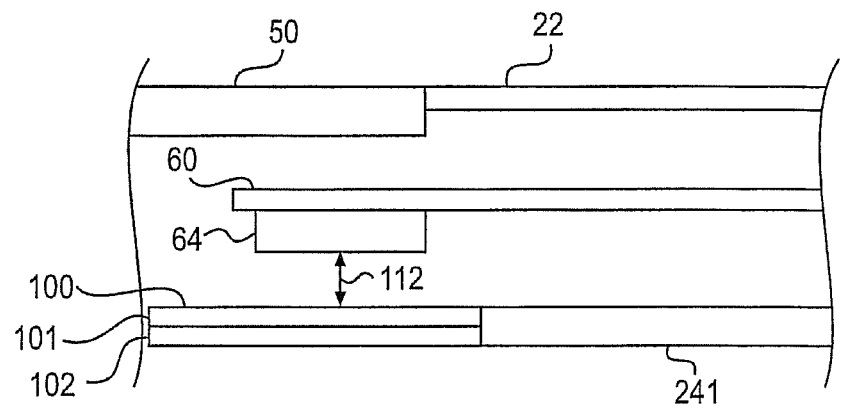
FIGS. 4A-4C are side views of a computer according to an example embodiment.
Figure 4B:
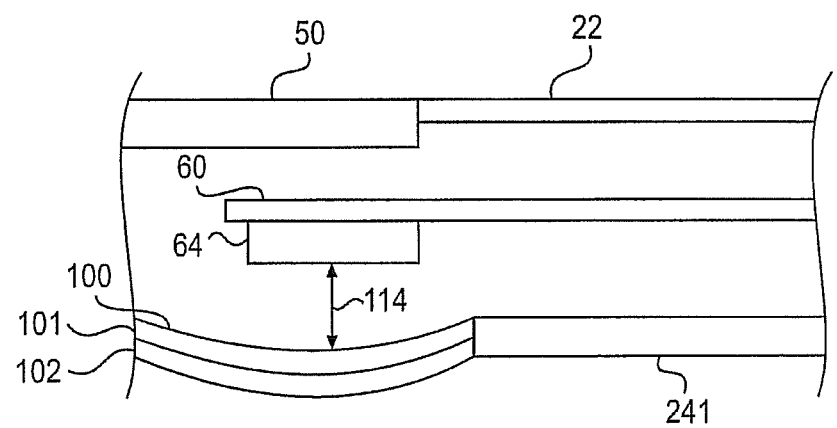
Figure 4C:
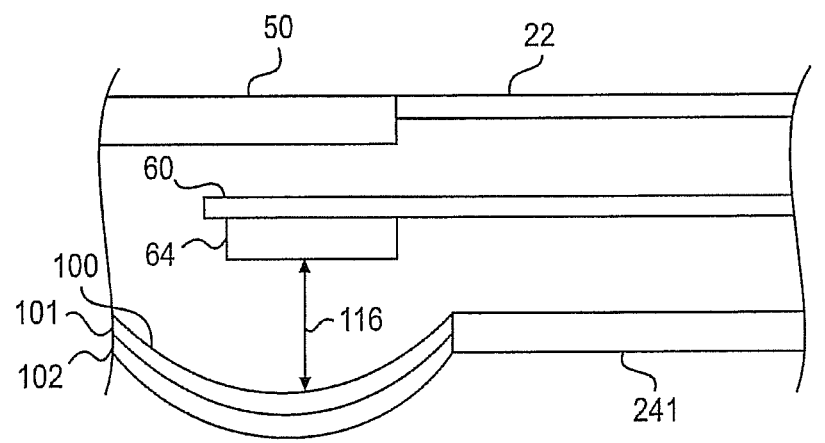

FIGS. 4A-4C are side views of a computer according to an example embodiment. Other embodiments and configurations may also be provided.

More specifically, FIGS. 4A-4C show the first side 22 of the base 20, the skin 241 (on the second side 24) and a bimetallic material structure 100. The bimetallic material structure 100 may correspond to the door 70 of the base 20.

FIGS. 4A-4C also shows the keyboard 50, the circuit board 60 and the processor 64 on the circuit board 60. For ease of illustration, FIGS. 4A-4C only shows the processor 64 on the circuit board 60 (even though the socket 62 may be provided on the circuit board 60 to receive the processor 64). Other heat producing devices or heat components may also be provided.

FIGS. 4A-4C show the bimetallic material structure 100 provided at a location (or area) that aligns with a heat producing device provided in the base 20. For example, the bimetallic material structure 100 may be provided in a same area as the processor 64 (i.e., the bimetallic material structure 100 is aligned with the processor 64). The bimetallic material structure 100 may be surrounded by the skin 241 (i.e., forming the outer surface of the second side 24 of the base 20).

In another embodiment, the entire bottom portion of the base 20 may be formed of a bimetallic material structure 100 (or bimetallic structure). In another embodiment, the entire chassis that forms the base 20 may be formed of the bimetallic material structure 100 (or bimetallic structure).

The bimetallic material structure 100 may be formed of two metal layers that have different coefficients of thermal expansion (CTE). For example and as shown in FIGS. 4A-4C, the bimetallic material structure 100 may include a first metal layer 101' and a second metal layer 102. The first metal layer 101 may have a first CTE, and the second metal layer 102 may have a second CTE. The first CTE may be less than the second CTE.

As one example, the first metal layer 101 having the first CTE may be a passive layer formed of FeNi36. The second metal layer 102 may be an active layer formed of MnCu18Ni10. Other materials may be used for both the first metal layer 101 and the second metal layer 102.

The different CTEs of the first and second metal layers 101, 102 may allow more bending of the bimetallic material structure 100 when a temperature of the bimetallic material structure 100 (or an interior of the base 20) increases. The second metal layer 102 may bend more than the first metal layer 101, as shown in FIGS. 4A-4C. Embodiments may utilize a larger bending degree of the bimetallic material structure 100 to increase a gap between the hot component and the bimetallic material structure 100. Thus, a temperature of the skin may be reduced.

FIG. 4A shows a gap 112 between the processor 64 (i.e., a hot component) and the first metal layer 101 when a colder temperature (or first temperature) is provided in the internal area of the base 20. FIG. 4B shows a gap 114 between the processor 64 and the first metal layer 101 when a warmer temperature (or second temperature) is provided in the internal area of the base 20. FIG. 4C shows a gap 116 between the processor 64 and the first metal layer 101 when a hotter temperature (or third temperature) is provided in the internal area of the base 20. The gap 116 is larger than the gap 114, and the gap 114 is larger than the gap 112.

Embodiments may relate to a tablet in which the base may be called a body. Embodiments may also relate to a notebook computer.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject' combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a body having one or more electronic components, the body having a first portion and a second portion, the second portion including a first layer of material comprising a first metal and a second layer of material comprising a second metal, and at least one electronic component being between the first portion and the second portion, wherein the first layer and the second layer form a bimetallic material portion, and wherein the bimetallic material portion to increase a gap between the at least one electronic component and the bimetallic material portion when a temperature within the body increases.

2. The electronic device of claim 1, wherein the second portion of the body to surround edges of the bimetallic material portion.

3. The electronic device of claim 1, wherein the bimetallic material portion is a door to align with the at least one electronic component within the body.

4. The electronic device of claim 1, wherein the first layer has a first coefficient of thermal expansion, and the second layer has a second coefficient of thermal expansion that is different from the first coefficient of thermal expansion.

5. The electronic device of claim 4, wherein the first coefficient of thermal expansion is less than the second coefficient of thermal expansion.

6. The electronic device of claim 5, wherein the first layer forms at least a part of an inner wall of the body, and the second layer forms at least a part of an outer wall of the body.

7. The electronic device of claim 1, wherein the electronic device is a tablet.

8. An electronic device comprising:
   a lid having a display; and
   a base having one or more electronic components, the base having a top portion and a bottom portion, the bottom portion including a first layer of material comprising a first metal and a second layer of material comprising a second metal, and at least one electronic component being between the top portion and the bottom portion, wherein the first layer and the second layer form a bimetallic material portion, and wherein the bimetallic material portion to bend based on an internal temperature of the base.

9. The electronic device of claim 8, wherein the bottom portion of the base to surround edges of the bimetallic material portion.

10. The electronic device of claim 8, wherein a gap between the internal component and the first metal layer to increase based on an internal temperature of the base.

11. The electronic device of claim 8, wherein the first layer has a first coefficient of thermal expansion, and the second layer has a second coefficient of thermal expansion that is different from the first coefficient of thermal expansion.

12. The electronic device of claim 11, wherein the first coefficient of thermal expansion is less than the second coefficient of thermal expansion.

13. The electronic device of claim 8, wherein the first layer forms at least part of an inner wall of the base, and the second layer forms at least part of an outer wall of the base.

14. The electronic device of claim 8, wherein the electronic device is a notebook computer.

15. The electronic device of claim 8, wherein the base includes a keyboard.

16. An electronic device comprising:
   a body having one or more electronic components, the body having a first portion and a second portion, the second portion including a first layer of material comprising a first metal and a second layer of material comprising a second metal, and at least one electronic component being between the first portion and the second portion,
   wherein the first layer has a first coefficient of thermal expansion, and the second layer has a second coefficient of thermal expansion that is different from the first coefficient of thermal expansion.

17. The electronic device of claim 16, wherein the first layer and the second layer form a bimetallic material portion.

18. The electronic device of claim 17, wherein the second portion of the body to surround edges of the bimetallic material portion.

19. The electronic device of claim 16, wherein the first coefficient of thermal expansion is less than the second coefficient of thermal expansion.

20. The electronic device of claim 16, wherein the first layer forms at least a part of an inner wall of the body, and the second layer forms at least a part of an outer wall of the body.

* * * * *